May 5, 1970   C. W. NEEFE   3,510,207
METHOD OF FITTING ASPHERIC CONTACT LENSES
Filed June 2, 1967

INVENTOR.
Charles W. Neefe

United States Patent Office 3,510,207
Patented May 5, 1970

---

3,510,207
METHOD OF FITTING ASPHERIC CONTACT LENSES
Charles W. Neefe, Box 361,
Big Spring, Tex. 79720
Filed June 2, 1967, Ser. No. 643,250
Int. Cl. G02c 7/04; A61b 3/00
U.S. Cl. 351—40                                          1 Claim

ABSTRACT OF THE DISCLOSURE

A method of fitting aspheric contact lenses by utilizing a lens having substantially the same cross section as the cornea to which it is applied and which includes an opaque area located at the center of the lens and dimensioned to occupy half the area of the dilated pupil of the eye. A second lens is also utilized which is comprised of an opaque material with a transparent aperture located at the center thereof and occupying half the area of the dilated pupil. Measurements are taken of the refraction of light at the center of the pupil area and at the periphery of the pupil area by utilizing these two lenses. The measurements determine the shape of an aspheric contact lens having a smoothly changing curvature between the central and peripheral curvatures thereof such that light entering all portions of the aspheric lens will be focused to a common point on the retina of the eye.

---

This is an improvement of my Pat. No. 3,187,338, "Corneal Contact Lens of Wide Fitting Range With Sine Curve Concave Surface."

Contact lenses with aspheric concave surfaces are now in common use. The aspheric concave surface affords greatly improved phycial fitting characteristics as described in my earlier patent. These aspheric concave surfaces are produced from plastic material having an index of refraction substantially higher than the precorneal fluid. A degree of aberration is thus created whereby the focal length of the peripheral rays is shorter than the central rays. The aspheric concave surfaces are based upon the sine curve, ellipse or parabola and have a longer radius of curvature near the edge, which results in a shorter focal length for that area. Approximately 70% of this aberration is neutralized by the precorneal fluid as described in my earlier patent. The remaining 30% produces a degradation of the image cast upon the retina.

An accurate method of measuring this difference in focal length between the central and peripheral zones of the eye is needed in order to properly design and construct a convex aspheric surface to neutralize the aberrations created by aspheric concave surfaces and the inherent aberrations of the eye.

An object of the present invention is to eliminate aberration created by differences in focal lengths of the peripheral and central zones of aspheric base contact lenses.

Another object is to provide a contact lens having aspherical curvatures on the concave and convex surfaces combining excellent fitting qualities with improved optical qualities.

Another object is to neutralize the inherent spherical aberration present in the human eye.

Another object of this invention is to provide a method, and an apparatus for subjectively and directly measuring the inherent aberrations of the eye.

Another object of this invention is to provide a method, and an apparatus for subjectively and directly measuring the aberrations of the eye with a contact lens in place on the cornea.

Figure 1:
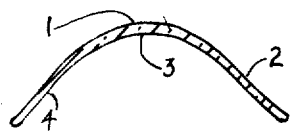
Figure 2:
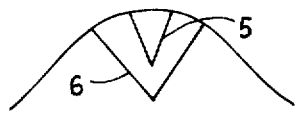
Figure 3:
Figure 4:
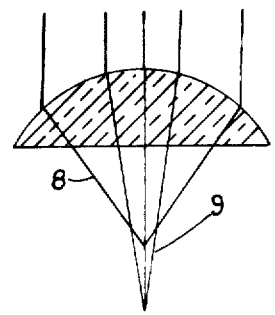
Figure 5:
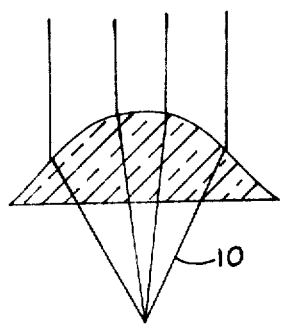
Figure 6:
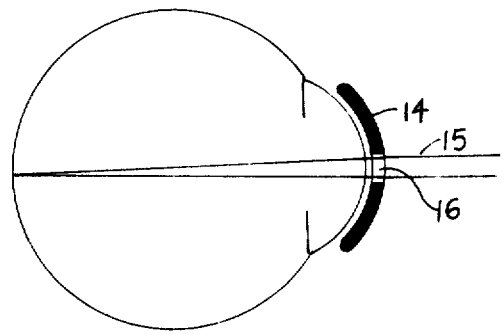
Figure 7:
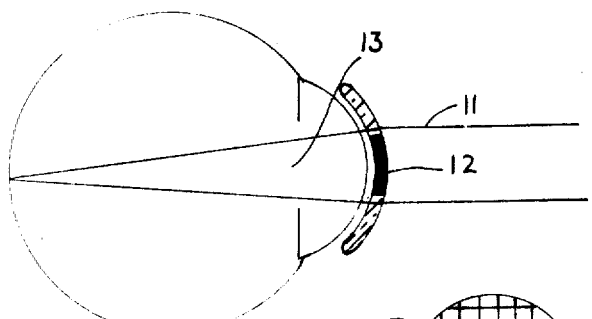
Figure 8:
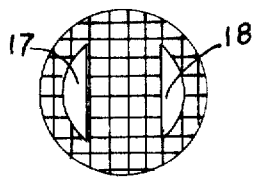

These and other objects and advantages of the present invention will be fully apparent from the following description when taken in conjunction with the annexed drawings in which:

FIG. 1 is the biaspheric lens in section.
FIG. 2 is the aspheric curve used on the convex surface.
FIG. 3 is the biaspheric lens in place on the eye in section.
FIG. 4 illustrates light passing through a lens with spherical convex surfaces.
FIG. 5 illustrates light passing through a lens having an aspheric convex surface.
FIG. 6 is the eye in section with the periphery occluded.
FIG. 7 is the eye in section with the center of the pupil occluded.
FIG. 8 is an ocular lens with two apertures.

The biaspheric lens functions as follows: The excessive positive refractive power present at the periphery of the concave aspheric surface is a result of the flattening of the lens surface 4 as shown in FIG. 1. The central concave zone 3 of FIG. 1 is of a shorter radius than the edge. The area having the shorter concave radius will possess the higher degree of negative refraction and a longer focal length. When the lens is in place on the eye, as shown in FIG. 3, the tear film 7 neutralizes 70% of the aberration present at the rear surface. 30% of the aberration will remain effective. This can be neutralized only by applying the same basic aspheric curvature to the convex surface, however the amplitude must be reduced to 30% if the aberration present at the rear surface is to be neutralized. The human eye has an inherent degree of spherical aberration present. This natural aberration may be compensated for by over correcting the aberration induced by the concave aspheric surface. The curvature of the cornea differs from eye to eye, as does the corneal topography, as shown in my earlier patents. The creptalline lens also possesses errors of refraction and curvature which are inconsistent. To eliminate this inherent spherical aberration and reduce astigmatism of oblique incidence, an aspheric convex surface is employed. The degree of peripheral flattening required on the convex surface of a contact lens for use on any given eye regardless of curvature or refractive error may be determined subjectively by occluding the central zone of the cornea 12 in the manner illustrated in FIG. 7. The method of construction and optics of this lens were disclosed in my Pat. No. 3,034,403 field Apr. 3, 1959. The degree of asphericity required is determined as follows: The cornea of the dark adapted eye is anaesthetized and a large spherical plano lens having an opaque central area 12 3 m./m. in diameter is positioned to center over the pupil 13. The opaque occludere should cover 50% of the area of the dilated pupil. If the opaque area approaches the pupil area diffraction may obscure the intended results. A refraction measurement of the optical system of the eye is then carried out in the established manner. A second lens having a transparent central area 16 2½ m./m. in diameter as shown in FIG. 6, surrounded by an opaque area 14, is positioned to center over the pupil of the eye and a second refraction carried out in the established manner. It will be found that less refractive power is required to focus the peripheral rays than the central rays. This difference in refraction of the central and peripheral zones is then incorporated in the front surface by lengthening the radius of curvature of the peripheral area by the prescribed amount. Measurements of the focal length of the peripheral area of the cornea may also be made by dilating the pupil and placing a contact lens on the eye having two apertures 17 and 18 illustrated in FIG. 8, located at the margin of the pupil. The apertures are approximately 2 millimeters in diameter and 3 millimeters apart.

If the focal point through these apertures is in front of the retina, a double image will be seen. A double image will also be seen if the focal point is behind the retina. Only if the image is found on the retina will a single image be seen. In this way, the required refractive power to focus a sharp image on the retina through the peripheral zone of the cornea may be measured accurately. The apertures may be rotated and the refractive error for any meridian may be found for the correction of astigmatism. After the refractive power for the central and peripheral zones are known, a lens is fabricated having a smoothly changing aspheric curvature on the convex surface. The central area is fabricated to have the convex curvature required to focus parallel light ray to a sharp point focus on the retina. The peripheral zone is also given a convex curvature which will focus the peripheral ray to the same point focus upon the retina. Since the refractive power required is known, the curvature for each zone may be determined from the following formula:

$$D = \frac{N-1}{R}$$

in which D=refractive power required in diopters, N=refractive index of lens material used and R=radius of curvature. It has been found that the required change of curvature of the aspheric convex surface is a segment of a sine curve. An ellipse or parabola properly scaled will also provide the required peripheral flattening. It is important, however, that a true aspheric curve providing a smoothly changing curvature be used. The central area must be very near spherical curvature and a smoothly progressive flattening of curvature extending outward past the optical area of the lens.

A convex spherical surface shown in FIG. 4, possesses spherical aberration. The peripheral rays 8, FIG. 4, have a shorter focal length than the central ray 9. This error may also be corrected by employing a convex aspheric surface.

An aspheric lens shown in FIG. 5, having a convex surface of a sine, ellipse or parabola configuration properly scaled to yield the correct lengthening of radius at the edge, will be unifocal as all areas of the lens will focus light rays 10 to the same point.

The degree of flattening is determined by occluding the central area and measuring the refractive power required at the periphery of the dilated pupil. The rate of change may correspond to a sine curve, ellipse, or parabola properly scaled to yield the required degree of peripheral flattening. In actual usage, the rate of flattening provided by an ellipse, sine or parabola yield excellent results with no distinguishable difference when properly scaled to produce the required degree of flattening. All three curves are nearly spherical over the central area and smoothly become progressively flatter near the edge. These being the requirements necessary for achieving a point focus derived from all areas of the entrance pupil all three curves are considered equal and acceptable when scaled to yield the required degree of flattening.

In view of the above, it will be seen that the several objects of the invention are achieved and other advantageous results attained. As many changes could be made in the above constructions and methods without departing from the scope of the invention, it is intended that all matter contained in the above description or shown in the accompanying drawings shall be interpreted as illustrative and not in a limiting sense.

I claim:

1. The method of fitting an aspheric prescriptive contact lens to the eye comprising:
    measuring the refractive power of the outer peripheral pupillary area of the eye while excluding light from entering the central portion of the eye pupil by applying to the eye a first contact lens having an opaque central portion and a size and rear surface curvature substantially the same as the cornea of the eye and refracting the eye with the first contact lens in place,
    measuring the refractive power of the central pupillary area of the eye while excluding light from entering the peripheral portion of the eye pupil by applying a second contact lens having an opaque peripheral portion and a size and rear surface curvature substantially the same as the cornea and refracting the eye with the second contact lens in place, and
    forming the prescriptive contact lens with a size and rear surface curvature substantially the same as the cornea and an aspheric front surface curvature incorporating the central and peripheral refractive powers determined by the central and peripheral measurements, said aspheric front surface having a smoothly varying curvature between the central and peripheral areas so that parallel light rays passing through said lens at any point will be focused at a common point on the retina of the eye.

References Cited

UNITED STATES PATENTS

| 2,101,016 | 12/1937 | Beach | 350—197 X |
| 2,129,305 | 9/1938 | Feinbloom | 351—162 |
| 3,034,403 | 5/1962 | Neefe | 351—162 |
| 3,187,338 | 6/1965 | Neefe | 351—160 |
| 3,344,692 | 10/1967 | Volk. | |

FOREIGN PATENTS 620,852   3/1949   Great Britain.

OTHER REFERENCES

Magatani, Article in Contacto, vol. 5, No. 12, Dec. 1961, pp. 403–411 cited.

Morris, Article in Optical Journal & Review of Optometry, vol. 103, No. 11, June 1, 1966, pp. 15–23 cited.

Kaplan, "The Aplanatic Contact Lens," Two part article, Part I Optometric Weekly, Feb. 9, 1967, p. 25–29; Part II Optometric Weekly, Feb. 16, 1967, pp. 42–45.

DAVID H. RUBIN, Primary Examiner

U.S. Cl. X.R.

351—160, 177